A. DELKESCAMP.
PAD-LOCK.

No. 177,814. Patented May 23, 1876.

Witnesses
John Becker
Fred Haynes

Adolph Delkescamp
by his Attorney
Brown & Allen

UNITED STATES PATENT OFFICE.

ADOLPH DELKESCAMP, OF SOUTHINGTON, CONNECTICUT, ASSIGNOR OF ONE-HALF HIS RIGHT TO JAMES D. BACON, OF NEW YORK, N. Y.

IMPROVEMENT IN PADLOCKS.

Specification forming part of Letters Patent No. 177,814, dated May 23, 1876; application filed November 20, 1875.

*To all whom it may concern:*

Be it known that I, ADOLPH DELKESCAMP, of Southington, in the county of Hartford, and State of Connecticut, have invented an Improvement in Padlocks; and I do hereby declare that the following is a full, clear, and exact description thereof.

My invention consists in a novel construction of a padlock, having its bow or shackle attached to the pod or body of the lock or to another bow by a swivel-joint, and in certain details of construction, arrangements, and operation of the various parts, whereby several advantages are obtained, as hereinafter particularly described and claimed.

The bow or shackle is attached to the pod or main body of the lock by a swivel-joint, so as to allow it to swing transverse to said body instead of parallel with the greatest length or width, as in the common padlock. The pod or main body of the lock may be of the usual or any suitable construction, or may be similar in form to the bow or shackle. The latter form may be preferred in some cases, as it enables both parts to be made of solid wrought iron or steel, and thus cheapens and simplifies the construction. The bolt may be arranged in the body or pod, and shoot into a socket in the bow or shackle, and the key may act directly on the bolt or operate through an arm or lever, and pull on the bolt to withdraw it from the socket; or the bolt may be arranged in the bow or shackle and shoot into a socket in the pod, and the key may operate through a sliding pin and push on the bolt to release it from the socket. The lock may be provided with tumblers, or may be guarded in any suitable manner.

The lock may be used as a seal lock by providing for the insertion of the seal-wire through the bolt or through the key-post.

The accompanying drawing illustrates a mode of carrying out my invention.

Figure 1:
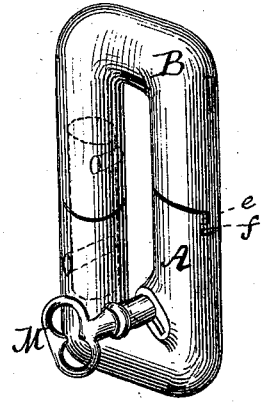
Figure 2:
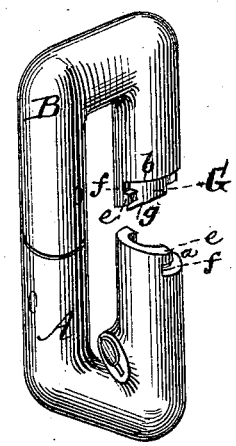
Figures 3, 4:
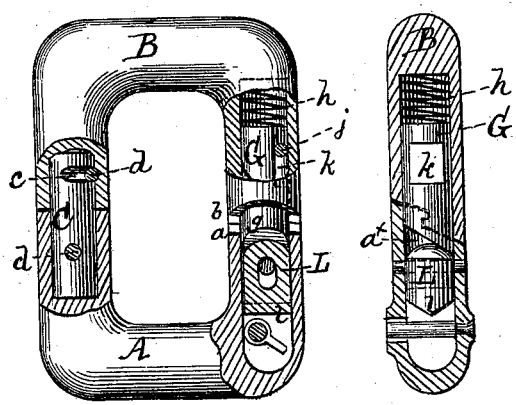

Figure 1 is a perspective view of a lock in a closed and locked position. Fig. 2 is a similar view of the lock in an open position. Fig. 3 is a side view, partly in section. Fig. 4 is a section at right angles to Fig. 3.

The bow or shackle B is attached to the pod or main body A by a swivel-joint, which is here shown as formed by a pivot, C, inserted in recesses in the two parts and held in place by pins $d\, d$, one of which engages with a groove, $c$, in the pivot C, and prevents the bow from being pulled outward from the pod, but allows it to swing laterally. The free end of the bow is formed with an inclined or beveled surface, $b$, for engagement with a corresponding inclined surface, $a$, on the pod or body A; and each part is provided with teeth $e$ and notches $f$, which engage with each other, so that when the lock is closed the contiguous portions of the two parts fit together with exact nicety, and the engagement of the teeth and notches, acting in combination with the swivel-joint, prevents the possibility of the parts being forced asunder longitudinally.

The bolt shown herein consists of a sliding bolt, G, having its front end $g$ beveled to enable it to slide freely on the incline $a$ to lock the bow. This bolt slides in a recess in the bow, with a spring, $h$, behind it, having a tendency to keep it pushed forward. Its longitudinal motion is limited by means of a pin, $j$, and slot $k$, which also serve to prevent it from turning. When the lock is closed the bolt rides up the incline $a$, and then shoots into a recess, $a^x$, in the pod, and thus the bow or shackle is securely locked. In the recess $a^x$ works a sliding pin, L, the outer end of which is rounded, and reaches nearly to the end of the bolt G, and the inner end of which is operated by a key, M, of any suitable construction, and may be formed with a knife-edge, $l$, to reduce the friction of the key. The bow is unlocked by turning the key and forcing the pin L outward, so that its rounded end bears against the incline $g$, and pushes the bolt backward until its front end is clear of the recess in the pod, when the incline $g$ slides over the rounded end of the pin L and over the incline $a$, and causes the free end of the bow to swing laterally away from the pod.

It will be seen that by the construction of the bow and pod shown herein the bolt may be arranged in the pod and shoot into the recess in the bow, in which case the key would be arranged to pull on the bolt in order to release it.

A padlock constructed substantially as herein described possesses several advantages. It is cheap, simple, strong, and durable. Each of the two parts may be made of a solid piece of metal. When the bow is locked the two parts fit together so nicely as to prevent the possibility of the entrance of dust or water into the recesses.

What I claim as new, and desire to secure by Letters Patent, is—

The combination of the pod or body A and bow or shackle B, connected on one side by a swivel-joint, and provided on the other side with teeth $e$ and notches $f$, engaging with each other, and a sliding spring-bolt, G, substantially as herein described.

ADOLPH DELKESCAMP.

Witnesses:
F. A. ROBINSON,
W. A. WRIGHT.